(12) United States Patent
McGahey et al.

(10) Patent No.: US 10,233,834 B2
(45) Date of Patent: Mar. 19, 2019

(54) TURBOCHARGER COMBINING AXIAL FLOW TURBINE WITH A COMPRESSOR STAGE UTILIZING ACTIVE CASING TREATMENT

(71) Applicant: BorgWarner Inc., Auburn Hills, MI (US)

(72) Inventors: Michael E. McGahey, Troy, MI (US); Michael Ausbrooks, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 368 days.

(21) Appl. No.: 14/904,716

(22) PCT Filed: Jul. 17, 2014

(86) PCT No.: PCT/US2014/047011
§ 371 (c)(1),
(2) Date: Jan. 13, 2016

(87) PCT Pub. No.: WO2015/013100
PCT Pub. Date: Jan. 29, 2015

(65) Prior Publication Data
US 2016/0160756 A1    Jun. 9, 2016

Related U.S. Application Data

(60) Provisional application No. 61/857,868, filed on Jul. 24, 2013.

(51) Int. Cl.
F04D 29/66 (2006.01)
F02C 6/12 (2006.01)
(Continued)

(52) U.S. Cl.
CPC .............. F02C 6/12 (2013.01); F02B 37/183 (2013.01); F04D 27/0207 (2013.01);
(Continued)

(58) Field of Classification Search
CPC ................ F02B 37/16; F02B 2037/162; F04D 27/0207; F04D 27/0215; F04D 27/29;
(Continued)

(56) References Cited

U.S. PATENT DOCUMENTS 3,778,194 A * 12/1973 Miller ................... F01D 25/186
415/175
3,936,241 A * 2/1976 Einbeck .................... F02C 7/20
417/360
(Continued)

*Primary Examiner* — Ninh H. Nguyen
(74) *Attorney, Agent, or Firm* — Young Basile Hanlon & MacFarlane, P.C.

(57) ABSTRACT

A turbocharger (1) with an axial flow turbine stage (2) includes a compressor stage (4) using active casing treatment (50) for choke flow improvement. With switchable slots (52, 54), one of the slots (52) may be between the compressor's full and splitter blades (27, 23) and one of the slots (54) can be located downstream of the compressor's splitter blades (23) to maximize choke flow capacity. In turbochargers with a wastegate assembly, a pneumatic actuator (32) may control both a wastegate control valve (30) and an active casing treatment slot selection valve (56).

17 Claims, 2 Drawing Sheets

(51) Int. Cl.
*F04D 27/02* (2006.01)
*F04D 29/42* (2006.01)
*F04D 29/68* (2006.01)
*F02B 37/18* (2006.01)

(52) U.S. Cl.
CPC ..... *F04D 27/0238* (2013.01); *F04D 27/0246* (2013.01); *F04D 29/4213* (2013.01); *F04D 29/685* (2013.01); *F05D 2220/40* (2013.01)

(58) Field of Classification Search
CPC ...... F04D 27/284; F04D 29/30; F04D 29/685; F01D 5/021; F01D 5/146
See application file for complete search history.

(56) References Cited

U.S. PATENT DOCUMENTS

| | | | | |
|---|---|---|---|---|
| 4,100,742 | A * | 7/1978 | Harp, Jr. | F02B 37/02 60/602 |
| 4,376,626 | A * | 3/1983 | Rossi | F23N 5/22 431/66 |
| 6,648,594 | B1 | 11/2003 | Homer_ et al. | |
| 7,229,243 | B2 | 6/2007 | Nikpour et al. | |
| 8,517,664 | B2 * | 8/2013 | Sun | F02B 47/08 415/126 |
| 8,579,591 | B2 * | 11/2013 | Ho | F04D 29/284 29/888.024 |
| 2007/0180826 | A1 | 8/2007 | Sumser et al. | |
| 2010/0150698 | A1 | 6/2010 | Wood et al. | |
| 2012/0171059 | A1 | 7/2012 | Love et al. | |

* cited by examiner

TURBOCHARGER COMBINING AXIAL FLOW TURBINE WITH A COMPRESSOR STAGE UTILIZING ACTIVE CASING TREATMENT

CROSS-REFERENCE TO RELATED APPLICATION

This application claims priority to and all the benefits of U.S. Provisional Application No. 61/857,868, filed on Jul. 24, 2013, and entitled "Turbocharger Combining Axial Flow Turbine with a Compressor Stage Utilizing Active Casing Treatment," the contents of which are incorporated by reference herein.

BACKGROUND

1. Field of the Disclosure

This disclosure relates to axial or highly mixed flow turbochargers. More particularly, this disclosure relates to a turbocharger that combines an axial flow turbine with a compressor stage using Active Casing Treatment.

2. Description of Related Art

In exhaust gas turbocharging, some of the exhaust gas energy resulting from combustion in an internal combustion engine, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel that is mounted on the same shaft so that rotation of the turbine wheel causes rotation of the compressor wheel.

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions.

Currently, a primary reason for turbocharging is to use exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

SUMMARY

The turbocharger includes an axial-flow turbine wheel. In an axial-flow turbine wheel, exhaust gas flow through the turbine wheel is only in the axial direction, along the turbine wheel rotational axis. This can be compared to radial-flow turbine wheels and mixed-flow turbine wheels. In a radial-flow turbine wheel, the exhaust gas flow into the wheel is centripetal, i.e. in a radial direction from the outside in, perpendicular to the wheel axis of rotation, and exhaust gas outflow is typically in the axial direction. In highly mixed-flow turbine wheels, the exhaust gas flow approaches the turbine wheel at an angle that is less than 45 degrees from the axis of rotation R, and exits axially.

A turbocharger turbine stage including an axial-flow turbine wheel is advantageous since the turbine wheel may have lower flow resistance and stress than a radial-flow turbine wheel. In some circumstances, the axial-flow turbine wheel or a highly mixed-flow turbine wheel may be more efficient than a radial flow turbine wheel because the exhaust gas is forced directly against the entire turbine wheel, while for radial-flow turbines the exhaust gas flows from the side of the turbine wheel and then around the perimeter of the turbine wheel. Thus, a turbine stage including an axial-flow or highly mixed-flow-turbine wheel can be desirable. In addition, an axial-flow turbine inherently has a lower moment of rotational inertia than does a radial-flow turbine, thus reducing the amount of energy required to accelerate the turbine to operating speed. The low inertia of axial-flow turbines is beneficial for high-speed automotive use, but an axial-flow turbine's low efficiency at diameters matched to the required compressor flow has been a limitation.

Historically, axial-flow turbine wheels have not been used in smaller, high speed turbines such as those used in automotive applications due to inefficiencies that occur in smaller sized turbomachinery. In this regard, a key design consideration is the effect of the turbine wheel on optimal blade speed ratio (BSR, where BSR is defined as U/Co). To maintain high total efficiency in an axial flow turbine wheel, maintaining a desired BSR results in reduction of the compressor wheel size to a diameter similar to that of the turbine wheel. That is, the ratio of the compressor wheel size (e.g., the diameter of the compressor wheel 28) to the turbine wheel size (e.g., the diameter of the turbine wheel 16) may be 1.00:1.00. This can be compared to a ratio of compressor wheel size to turbine wheel size in some conventional radial flow turbochargers of 1.10:1.00. In an axial-flow turbine turbocharger, the compressor wheel diameter reduction in size from 1.10 to 1.00 relative to the turbine wheel diameter limits compressor stage capability. Early axial flow turbines often endured such BSR related efficiency reductions. Thus, there is a need for a countermeasure for axial or highly mixed flow turbines and associated diameters of wheels without certain undesired side effects.

In some aspects, this disclosure relates to an axial-flow turbine turbocharger that includes a compressor housing including active casing treatment to address compressor wheel size-related inefficiencies found in some conventional axial-flow turbine turbochargers. For example, the axial-flow turbine turbocharger using active casing treatment on the compressor stage extends the wheels' choke line. The compressor wheel can thus have a reduced diameter, and BSR can be optimized. The turbine stage will be forced to operate at a high turbine tip speed resulting in higher turbine mechanical efficiencies during transient engine/turbo operation. Flow capacity of the compressor stage will be extended while avoiding the inconsistent surge behavior associated with some axial-flow turbochargers that employ back-to-back compressors.

A turbocharger with a wastegate assembly may have a single actuator for controlling both a wastegate control valve and a slot selection valve of the active casing treatment. The single actuator may actively control flow channel geometry with flow control and also energize the active casing treatment flow control.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
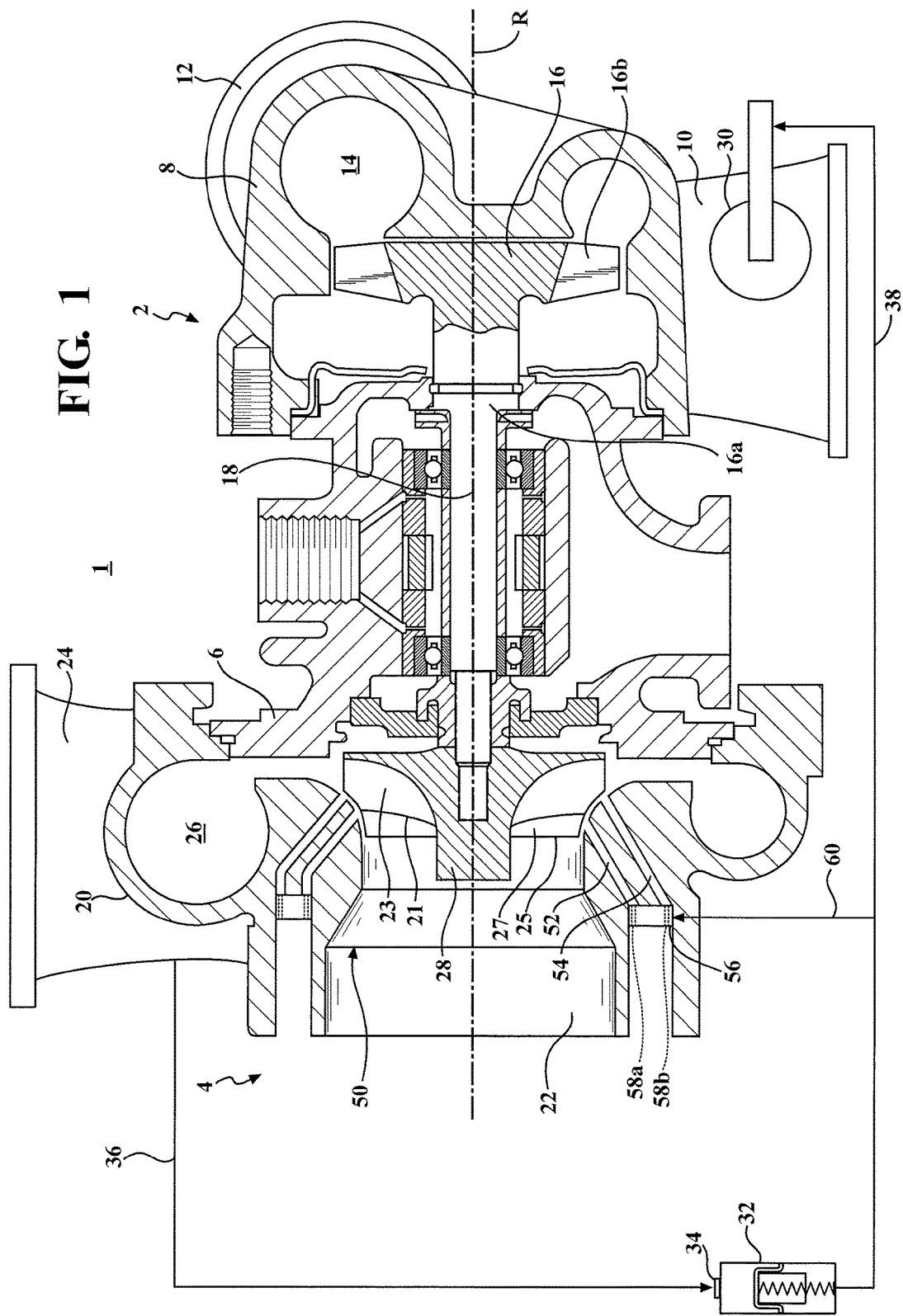
FIG. 1 is a cross-sectional view of an axial-flow turbocharger including an active casing treatment device.

Referring to FIG. 1, an exhaust gas turbocharger 1 includes a turbine stage 2, a compressor stage 4, and a bearing housing 6 disposed between and connecting the compressor stage 4 to the turbine stage 2. The turbine stage 2 includes a turbine housing 8 that defines an exhaust gas inlet 10, an exhaust gas outlet 12, and a turbine volute 14 disposed in the fluid path between the exhaust gas inlet 10 and the exhaust gas outlet 12. An axial-flow turbine wheel 16 is disposed in the turbine housing 8 between the turbine volute 14 and the exhaust gas outlet 12. The axial-flow turbine wheel 16 has a hub 16a and a plurality of axial-flow turbine blades 16b configured to rotate the turbine wheel 16 and a centrally attached rotatable shaft 18 when the turbocharger 1 receives exhaust gas flow from the engine. In some embodiments, the hub 16a is a low-stress small hub attached to the rotatable shaft 18 by conventional methods. The shaft 18 is rotatably supported within the bearing housing 6 and extends into the compressor stage 4. The compressor stage 4 includes a compressor housing 20 that defines an air inlet 22, an air outlet 24, and a compressor volute 26. A compressor wheel 28 is disposed in the compressor housing 20 between the air inlet 22 and the compressor volute 26. The compressor wheel 28 is connected to, and driven by, the shaft 18.

In use, the turbine wheel 16 is rotatably driven by an inflow of exhaust gas supplied from the exhaust manifold of an engine (not shown). Since the shaft 18 connects the turbine wheel 16 to the compressor wheel 28, the rotation of the turbine wheel 16 causes rotation of the compressor wheel 28. As the compressor wheel 28 rotates, it provides a pressure boost to the engine by increasing the air mass flow rate, airflow density and air pressure delivered to the engine's cylinders via an outflow from the compressor air outlet 24, which is connected to the engine's air intake manifold.

When the pressure of the exhaust gas is high, there may be more exhaust pressure than is required to provide the desired pressure boost. One solution for this problem is to divert exhaust gas away from the turbine wheel 16 during high exhaust gas pressure conditions, so that the amount of exhaust gas reaching the turbine wheel 16 is the quantity needed to provide optimum pressure boost. A wastegate valve 30 is used to divert exhaust gas away from the turbine wheel 16. Diversion of exhaust gases controls the turbine wheel rotational speed which, in turn, controls the rotational speed of the compressor wheel 28. By controlling the rotational speed of the compressor wheel 28, the wastegate valve 30 is able to regulate the maximum boost pressure provided to the engine by the turbocharger 1.

The wastegate valve 30 is disposed on the turbine housing 8 upstream of the turbine wheel 16, and is actuated by a pneumatic actuator 32 that uses the turbocharger 1 as a source of pressurized fluid. For example, a portion of the pressurized air from the compressor stage 4 is conducted to an air inlet 34 of the pneumatic actuator 32 via a line 36. When the compressor output pressure is high, the pneumatic actuator 32 opens the wastegate valve 30 via a linkage 38 (shown schematically in FIG. 1).

The compressor housing 20 includes an active casing treatment 50 that permits the axial-flow turbine turbocharger 1 to address inefficiencies related to compressor wheel size, discussed above. The active casing treatment 50 is configured to provide an increase in flow capacity for a given compressor wheel size and includes dual, switchable slots 52, 54 formed in the compressor housing 20 to selectively circulate air to areas on the compressor wheel 28. The active treatment 50 also includes a slot selection valve 56 that enables switching between the slots 52, 54. The first slot (e.g., "surge slot") 52 extends from an air source and opens at the compressor wheel 28 at a location between a leading edge 25 of the full blades 27 of the compressor wheel 28 and a leading edge 21 of splitter blades 23 of the compressor wheel 28. The surge slot 52 can be optimized to improve low end efficiency and surge margin. The second slot (e.g., "choke slot") 54 slots extends from an air source and opens at the compressor wheel 28 at a location downstream of the leading edge 21 of the splitter blades 23. The choke slot 54 can be designed to maximize choke flow capacity using the pressure drop to induce added flow for choke control. The benefits of one routing versus the other (e.g., directing flow to the first slot 52 versus the second slot 54) are dependent upon compressor wheel design and operating conditions.

The air source may be air that is routed from the compressor air inlet 22 at a location upstream of the compressor wheel 28, but is not limited to this configuration.

By providing active casing treatment 50 within the compressor housing 20, the compressor wheel 28 can have a relatively small wheel diameter compared to a compressor wheel used in some radial-flow turbine turbochargers, since the active casing treatment 50 addresses loss of flow capacity of the compressor wheel 28 due to relatively small wheel diameter. As a result, the axial-flow turbine turbocharger 1 can perform optimally. For example, the ratio of the compressor wheel size to the turbine wheel size may be in a range of 0.95:1.00 to 1.05:1.00. In some embodiments, the ratio is 1.00:1.00. In another example, in some embodiments, the Blade Speed Ratio, (e.g., U/Co) will be increased relative to that of some conventional turbochargers. In this example, the Blade Speed Ratio is in a range of 0.75 to 0.90. This can be compared to the Blade Speed Ratio of some conventional turbochargers of 0.70. This increase in Blade Speed Ratio extends the flow capacity of the compressor stage.

The compressor stage 4 with the active casing treatment 50 routes incoming air flow via the slots 52, 54 between the compressor's full and splitter blades or after the compressor's splitter blades (i.e. the second slot). This routing helps overcome choked flow limits that result in localized low pressure regions of the compressor wheel. In the illustrated embodiment, routing (e.g., slot selection) is accomplished using the slot selection valve 56 disposed in the air source passageway. The slot selection valve 56 includes axial openings 58a, 58b which can be selectively aligned with the first slot 52, the second slot 54, or neither slot 52, 54 by rotation of the slot selection valve 56 about the turbocharger rotational axis R. When the openings 58a, 58b of the slot selection valve are not aligned with either slot 52, 54, both slots 52, 54 are blocked and effectively no air flows therethrough. The slot selection valve 56 is connected via a linkage 60 to the pneumatic actuator 32, which is also connected to the wastegate valve 30 via the linkage 38. In particular, the actuator 32 can be used to actively control the flow channel geometry and therefore control the flow of air through the slots 52, 54 to the compressor wheel 28. Use of the same actuator 32 that is used to control the wastegate valve 30 is advantageous since during operation it would likely be desirable to energize the wastegate actuator and active casing treatment flow control at the same time. Moreover, doing so also substantially reduces the cost of implementing the active casing treatment device 50, since a dedicated active casing treatment actuator is not needed.

The active casing treatment 50 is not limited to being controlled by the slot selection valve 56. For example, a movable sleeve or other control may selectively cover one routing slot to circulate air to a particular portion of the compressor blade.

Although an exemplary active casing treatment 50 including the slots 52, 54 and slot selection valve 56 has been described herein, the active casing treatment is not limited to this configuration, and the active casing treatment 50 can be implemented in many ways. For example, the number, location, orientation and size of the slots may be optimized, and switching between respective slots may be accomplished using a variety of different valves, actuators, and connections between the valve and actuator.

Figure 2:
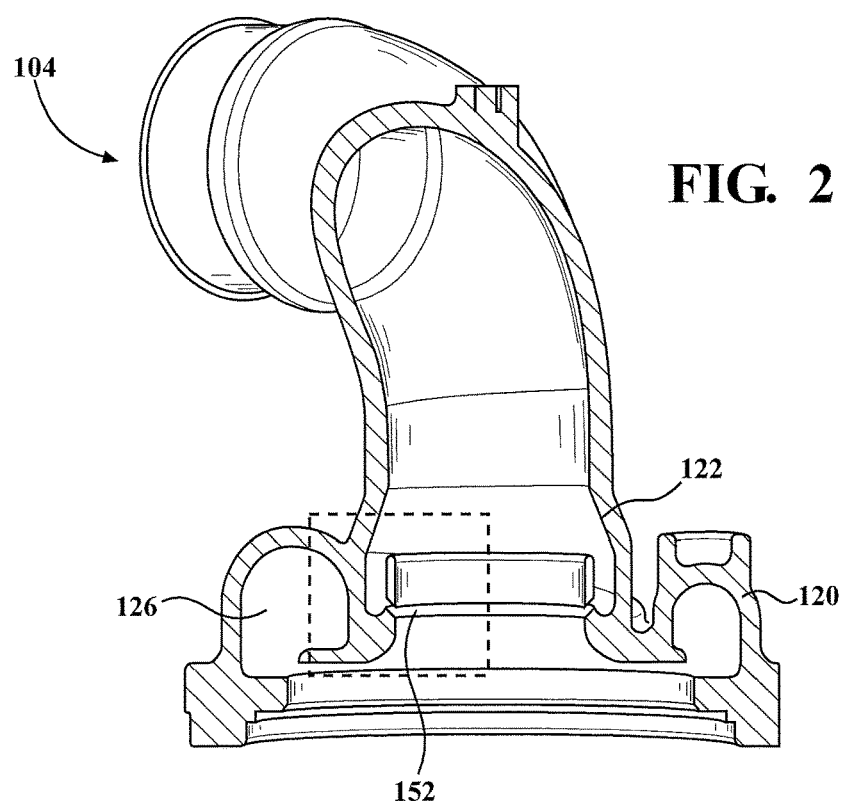
FIG. 2 is a partial cross-sectional view of a compressor stage of another axial-flow turbocharger including an active compressor cover choke and recirculation slot used to help overcome choked flow.
Figure 3:
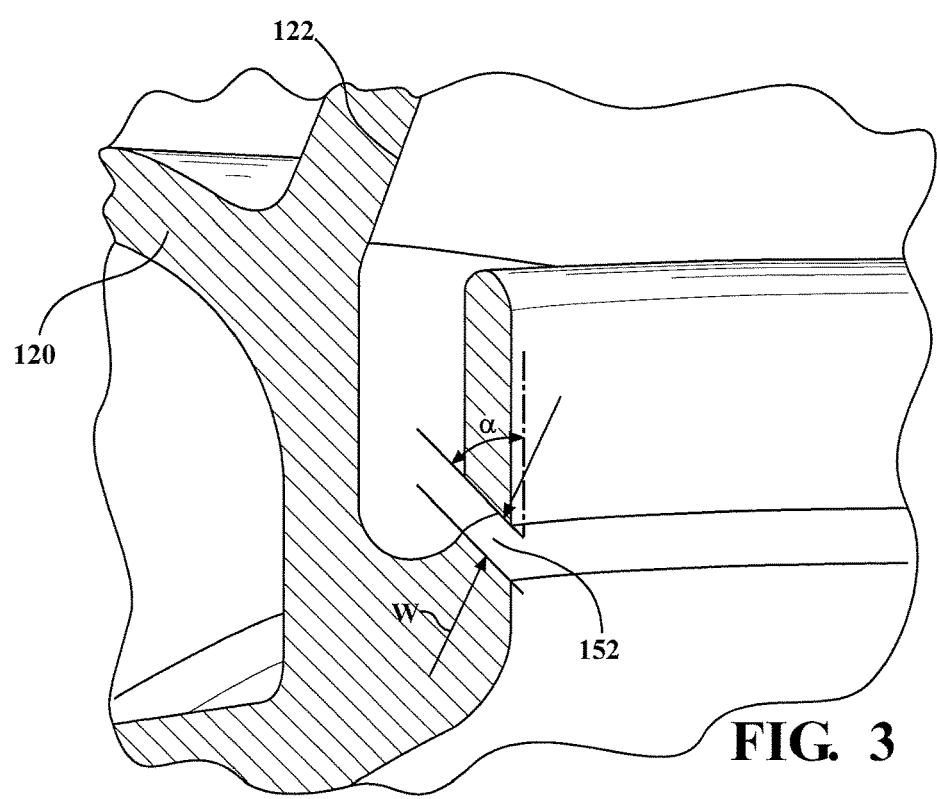
FIG. 3 is an enlargement of a portion of FIG. 2 detailing the configuration of the active compressor cover choke and recirculation slot.

Referring to FIGS. 2 and 3, a compressor stage 104 of an axial-flow turbocharger includes active casing treatment in the form of a single, circumferentially-extending active compressor cover choke and recirculation slot 152. The slot is formed in an air inlet 122 of a compressor housing 120 and is used to help overcome choked flow. The slot 152 allows air flow to be ejected to the compressor wheel (not shown for clarity) at a desired location. In the illustrated embodiment, the slot 152 opens to the compressor wheel midway between the main and splitter blade leading edges. For example, when used in a 55 mm K03 compressor stage, the slot 152 may have a width W in a range of 1.3 to 4.5 mm and be formed at an angle $\alpha$ relative to the inlet wall, where the angle $\alpha$ is in a range of 15 degrees to 50 degrees. A slot width W of 1.38 mm and slot angle $\alpha$ of 45 degrees has been found to work well for this compressor stage, providing an increase in mass flow at choke.

In an axial-flow turbine, gas flows through the turbine wheel in an axial direction. The axial-flow turbine usually includes the axial-flow turbine wheel substantially within the turbine housing. While an axial-flow turbine is a preferred turbocharger in this disclosure, the turbine can be used with a highly mixed flow turbine with less than 45 degree difference between the turbine wheel inlet and the axis of the rotating shaft.

Although the turbocharger 1 has been described herein as including the pneumatic actuator 32 to actuate the wastegate valve 30, the turbocharger is not limited to this configuration and other types of actuators can be used to control the wastegate valve 30. For example, in some embodiments, an electronic actuation controlled by the engine computer can be used to control the wastegate valve 30.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A turbocharger comprising a turbine stage and a compressor stage, the turbine stage including a turbine wheel selected from the group consisting of an axial flow turbine wheel and a mixed-flow turbine wheel, the compressor stage including:
   a compressor housing; and
   a compressor wheel disposed in the compressor housing and connected to the turbine wheel via a shaft, wherein the compressor housing includes active casing treatment that is configured to control air flow to the compressor wheel, the active casing treatment comprising:
      a first slot formed in a compressor inlet wall, the first slot defining an opening facing the compressor wheel at a first location;
      a second slot formed in the compressor inlet wall, the second slot defining an opening facing the compressor wheel at a second location; and
      a slot selection valve configured to control gas flow to the first slot and the second slot, and to permit selection between using the first slot and using the second slot, wherein the second location comprises a location downstream of a leading edge of splitter blades of the compressor wheel.

2. A turbocharger comprising a turbine stage and a compressor stage, the turbine stage including a turbine wheel selected from the group consisting of an axial flow turbine wheel and a mixed-flow turbine wheel, the compressor stage including:
   a compressor housing; and
   a compressor wheel disposed in the compressor housing and connected to the turbine wheel via a shaft, wherein the compressor housing includes active casing treatment that is configured to control air flow to the compressor wheel, the active casing treatment comprising:
      a first slot formed in a compressor inlet wall, the first slot defining an opening facing the compressor wheel at a first location;
      a second slot formed in the compressor inlet wall, the second slot defining an opening facing the compressor wheel at a second location; and
      a slot selection valve configured to control gas flow to the first slot and the second slot, and to permit selection between using the first slot and using the second slot, wherein the first location comprises a location between a leading edge of full blades of the compressor wheel and a leading edge of splitter blades of the compressor wheel.

3. A turbocharger comprising a turbine stage and a compressor stage, the turbine stage including a turbine wheel selected from the group consisting of an axial flow turbine wheel and a mixed-flow turbine wheel, the compressor stage including:
   a compressor housing; and
   a compressor wheel disposed in the compressor housing and connected to the turbine wheel via a shaft, wherein the compressor housing includes active casing treatment that is configured to control air flow to the compressor wheel, the active casing treatment comprising:
      a first slot formed in a compressor inlet wall, the first slot defining an opening facing the compressor wheel at a first location;
      a second slot formed in the compressor inlet wall, the second slot defining an opening facing the compressor wheel at a second location; and a slot selection valve configured to control gas flow to the first slot and the second slot, and to permit selection between using the first slot and using the second slot, wherein the turbine stage comprises a wastegate valve and the turbocharger includes a single actuator configured to control both the position of the wastegate valve and the slot selection valve.

4. A turbocharger comprising a turbine stage and a compressor stage, the turbine stage including a turbine wheel selected from the group consisting of an axial flow turbine wheel and a mixed-flow turbine wheel, the compressor stage including:
- a compressor housing; and
- a compressor wheel disposed in the compressor housing and connected to the turbine wheel via a shaft, the compressor wheel including a first set of blades and a second set of blades axially offset from the first set of blades, wherein the compressor housing includes an active casing treatment that is configured to control air flow to the compressor wheel, wherein the active casing treatment includes first and second slots formed in an inlet wall of the compressor, the first and second slots being in communication with the compressor wheel to selectively circulate air relative to the compressor wheel, wherein the first slot defines an opening positioned in a first location and the second slot defines an opening positioned in a second location axially offset from the first location, wherein the first and second sets of blades each define leading edges, the first opening being positioned between the leading edges of the first set of blades and the leading edges of the second set of blades.

5. The turbocharger of claim 4, wherein a ratio of the size of the compressor wheel to the size of the turbine wheel is in a range of 0.95:1.00 to 1.05:1.00.

6. The turbocharger of claim 4, wherein a ratio of the size of the compressor wheel to the size of the turbine wheel is 1.00:1.00.

7. The turbocharger of claim 4, wherein a Blade Speed Ratio of the turbocharger, defined as U/Co, is in a range of 0.75 to 0.90.

8. The turbocharger of claim 4, wherein the active casing treatment comprises a slot formed in a compressor inlet wall, the slot defining an opening facing the compressor wheel and being configured to selectively circulate air relative to the compressor wheel.

9. The turbocharger of claim 4, wherein the active casing treatment comprises:
- a first slot formed in a compressor inlet wall, the first slot defining an opening facing the compressor wheel at a first location;
- a second slot formed in the compressor inlet wall, the second slot defining an opening facing the compressor wheel at a second location; and
- a slot selection valve configured to control gas flow to the first slot and the second slot, and selectively permit air flow through the first slot and/or the second slot.

10. The turbocharger of claim 4, wherein the turbine wheel is an axial flow turbine wheel.

11. The turbocharger of claim 4, wherein the second opening is positioned downstream of the leading edges of the second set of blades.

12. The turbocharger of claim 4, wherein the active casing treatment further includes a slot selection valve selectively movable between a plurality of positions to control air flow into the first and second slots.

13. The turbocharger of claim 12, wherein the slot selection valve is movable between a first position, wherein the slot selection valve permits air flow through the first slot and restricts air flow through the second slot, and a second position, wherein the slot selection valve permits air flow through the second slot and restricts air flow through the first slot, and a third position, wherein the slot selection valve restricts air flow through both the first and second slots.

14. The turbocharger of claim 13, wherein the slot selection valve includes first and second openings, the first opening being positioned for alignment with the first slot when the slot selection valve is in in the first position, and the second opening being positioned for alignment with the second slot when the slot selection valve is in the second position, the first and second openings being out of alignment with the first and second slots when the slot selection valve is in the third position.

15. The turbocharger of claim 14, wherein the slot selection valve is rotatably movable between the first position, the second position, and the third position.

16. The turbocharger of claim 12, wherein the turbine stage includes a wastegate valve movable between open and closed positions to selectively divert exhaust gas away from the turbine wheel.

17. The turbocharger of claim 16, wherein the turbocharger includes a single actuator configured to control the positions of the wastegate valve and the slot selection valve.

* * * * *